United States Patent [19]

Huang et al.

[11] Patent Number: 5,337,623
[45] Date of Patent: Aug. 16, 1994

[54] AUTOMATIC TOOL SWITCHING MECHANISM

[75] Inventors: Kuo-Jao Huang; Chung-Ming Lee; Chi-An Li; Yeong-Kuang Liu, all of Hsinchu Hsien, Taiwan

[73] Assignee: Industrial Technology Research Institute, Hsinchu, Taiwan

[21] Appl. No.: 121,766

[22] Filed: Sep. 15, 1993

[51] Int. Cl.⁵ ............... B23B 29/24; F16H 25/08; F16H 53/00
[52] U.S. Cl. ................... 74/813 R; 74/53; 74/567; 74/569
[58] Field of Search ........... 74/567, 569, 834, 813 RX, 74/813 C, 813 L, 828, 522, 53 X, 57

[56] References Cited

U.S. PATENT DOCUMENTS

| | | | |
|---|---|---|---|
| 3,585,837 | 6/1971 | Bihler | 74/53 |
| 3,811,330 | 5/1974 | Weichhand et al. | 74/53 |
| 3,922,925 | 12/1975 | Takei et al. | 74/53 |
| 3,974,705 | 8/1976 | Wittkamp | 74/53 |
| 4,625,575 | 12/1986 | Le Bras | 74/569 X |
| 4,667,531 | 5/1987 | Kato et al. | 74/567 |
| 5,161,420 | 11/1992 | Feng | 74/53 |

FOREIGN PATENT DOCUMENTS 893253  6/1944  France ................... 74/53

Primary Examiner—Vinh T. Luong
Attorney, Agent, or Firm—W. Wayne Liauh

[57] ABSTRACT

An automatic tool change mechanism containing a cam shaft linked with a moter and a slotted cam. The cam shaft is driven by the motor to actuate the slotted cam to turn. The slotted cam is provided with a cam-profile groove, which is dimensioned so as to permit a driven roller to roll along the groove. The driven roller is caused to travel along the course of the cam-profile groove so as to cause an L-shaped rod to rock when the slotted cam is rotated by the cam shaft. The L-shaped rod is linked with a planetary gear, which engages a sector gear. The L-shaped rod contains a rocking section which actuates the planetary gear to turn. The planetary gear is connected with an output pitman, which is in turn coupled with a tool change shaft to cause the tool change shaft to engage in a linear motion. The driven roller also causes a turret, which is normal to the cam shaft, to rotate, and the rotation of the turret causes the tool change shaft to engage in a revolving motion. A tool change cycle is accomplished when the cam shaft completes a revolving cycle.

4 Claims, 7 Drawing Sheets

2-2 sectional view
FIG · 3

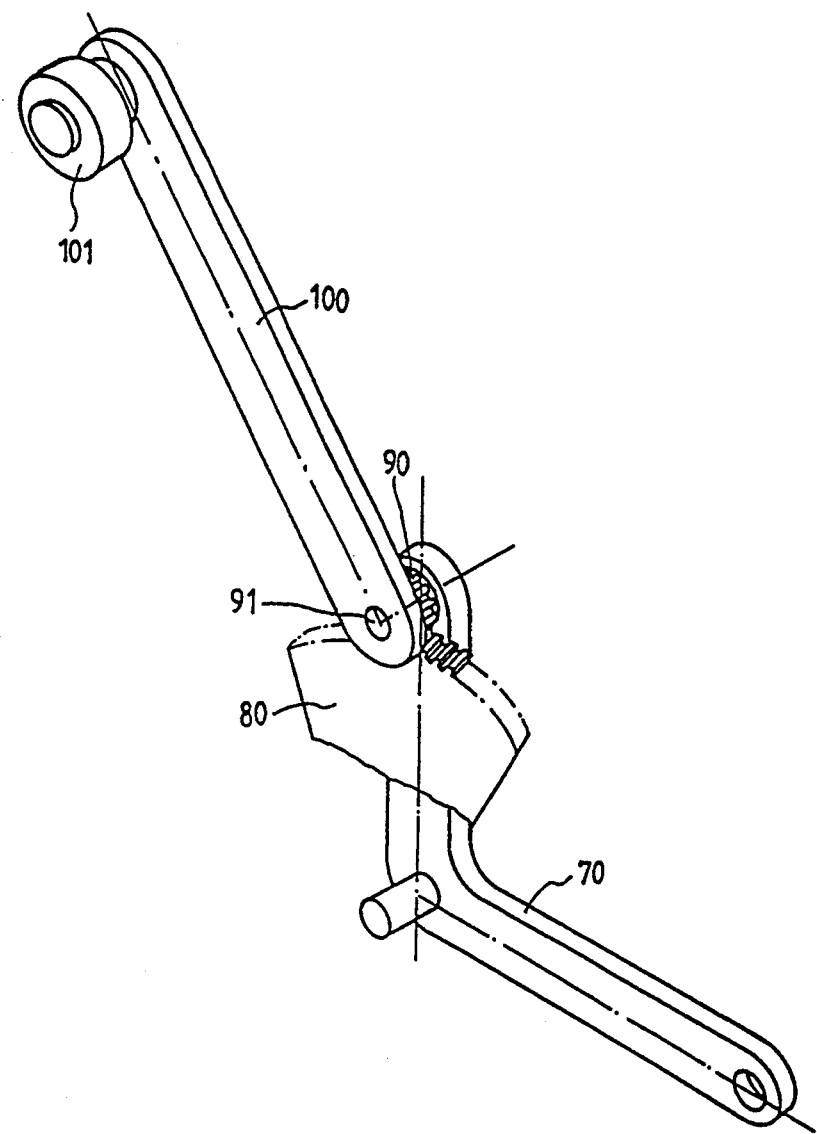
FIG · 5

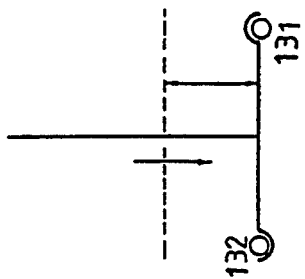
tool switching arm at a stsndby angle of 55.5°
FIG. 7A
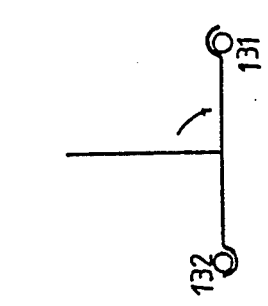
revolving for an angle of 55.5° to switch the tool
FIG. 7B
tool switching arm extends linearly for 165mm to do a tool withdrawing motion
FIG. 7C
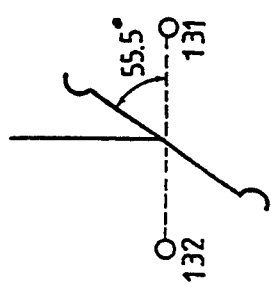
revolving 180° degrees to switch the tool
FIG. 7D
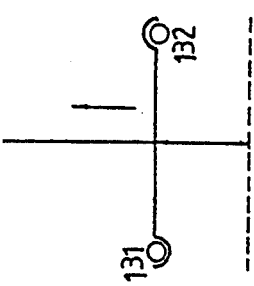
retracting 165mm
FIG. 7E
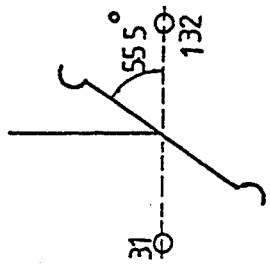
revolving for an angle of 55.5° to return to an original position
FIG. 7F

AUTOMATIC TOOL SWITCHING MECHANISM

FIELD OF THE INVENTION

The present invention relates generally to a numerically controlled machine tool, and more particularly to an automatic tool change mechanism of the numerically controlled machine tool.

BACKGROUND OF THE INVENTION

In general, a numerically controlled machine tool of the prior art is capable of changing automatically a tool mounted at the front end of the main spindle with another tool kept in the tool magazine. An automatic tool change device as described above comprises two mechanisms, which include a revolving motion and m linear motion. The shortcomings inherent in these two mechanisms of the prior art machine tool are described respectively hereinafter.

One mechanism by which the tool change task is brought about is controlled by the hydraulic power in conjunction with gears, gear racks, and a hydraulic cylinder. Such mechanism is defective in that the motion characteristics of the hydraulic device cannot be controlled with ease, and that the operation of the device is unstable so as to generate an impact force at the end of the motion. Further the locating precision of the mechanism is generally poor and unreliable. Still further, the operating speed of the mechanism cannot be significantly accelerated. In addition, the maintenance of the mechanism must be done frequently.

Another mechanism, by which the tool-change action is brought about by the numerically controlled machine tool of the prior art, is controlled by a cam system. This mechanism is limited in that the linear path of the tool-switching main spindle requires a greater stroke at the time when the tool-change process is under way, thereby resulting in an excess of the pressure angle of the cam. Accordingly, a greater force must be exerted on the cam. The remedial measure of the situation described above is to enlarge the dimension of the cam; nevertheless such remedial measure results in a substantial increase in the volume of the cam and the cost of making the cam. In addition, the bulky cam lead to a space problem in the assembly of the cam.

SUMMARY OF THE INVENTION

It is therefore the primary objective of the present invent i on to provide an automatic tool-change mechanism with an improved motion characteristic so as to enhance the precision of the mechanism.

It is another objective of the present invention to provide a reliable and durable tool-change mechanism.

It is still another objective of the present invention to provide an automatic tool-change mechanism, which is of such a size so as to pose no space problem in the assembly of the machine tool.

The foregoing objectives of the present invention are attained by an automatic tool change mechanism comprising a cam shaft linked with a motor and a slotted cam. The cam shaft is driven to revolve by the motor through a sprocket and a chain so as to actuate the slotted cam to turn. The slotted cam is provided with a cam-profile groove dimensioned in such a manner so as to permit a driven roller, which is fastened to a posterior end of an L-shaped rod, to roll a long the groove. The driven roller can be driven to travel along the course of the cam-profile groove so as to cause the L-shaped rod to rock accordingly at the time when the slotted cam is driven to rotate by the cam shaft. The L-shaped rod is linked with a planetary gear engaging a sector gear. The rocking action of the L-shaped rod actuates the planetary gear to turn. The planetary gear is connected with an output pitman which is capable of being actuated by the planetary gear to swing at a greater angle. The output pitman is in turn coupled with a tool change shaft by means of a shift so as to cause the tool change shaft to engage in a linear motion. The cam shaft is further linked with a roller-gear cam having spiral ribs capable of cooperating with the driven roller. The roller-gear cam can be driven to actuate the rotation of a turret which is normal to the cam shaft and Is linked with the tool change shaft. The rotation of the turret causes the tool change shaft to engage in a revolving motion. The tool change shaft is coupled at the posterior end thereof with a change arm provided with two tool mounts. As the cam shaft completes a revolving cycle, a tool change cycle is therefore accomplished.

The foregoing objectives features, structures and functions can be more readily understood upon a thoughtful deliberation of the following detailed description of the present invention in conjunction with the accompanying drawings.

BRIEF DESCRIPTION OF THE DRAWINGS

FIG. 5 is a perspective view showing that a sector gear meshes with a planetary gear, according to the present invention.

FIGS. 7A-7F are the schematical drawings of the sequences of the motions, respectively, of a tool change arm of the present invention.

DETAILED DESCRIPTION OF THE INVENTION

Figure 1:
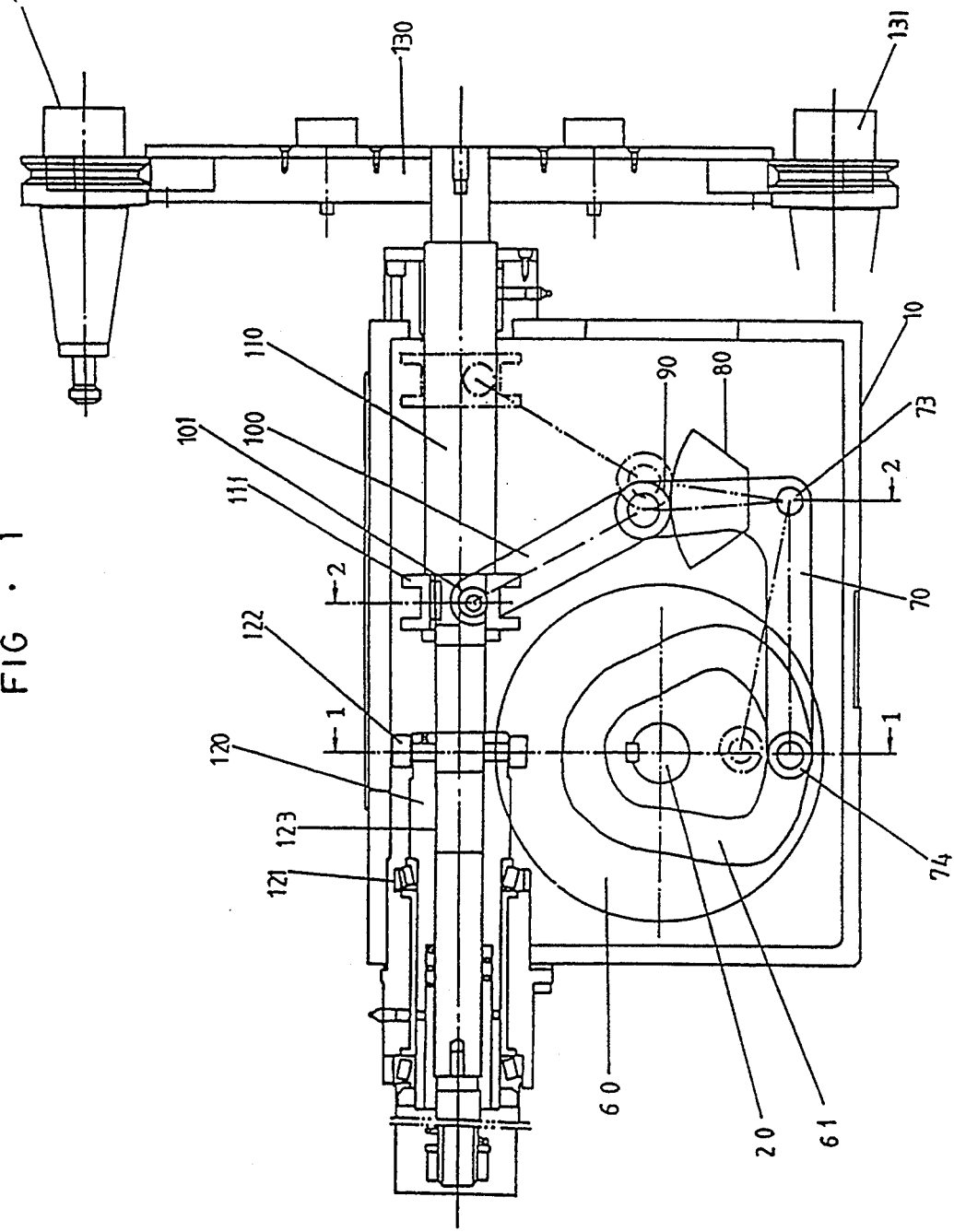
FIG. 1 shows a plan view of the present invention.
Figure 2:
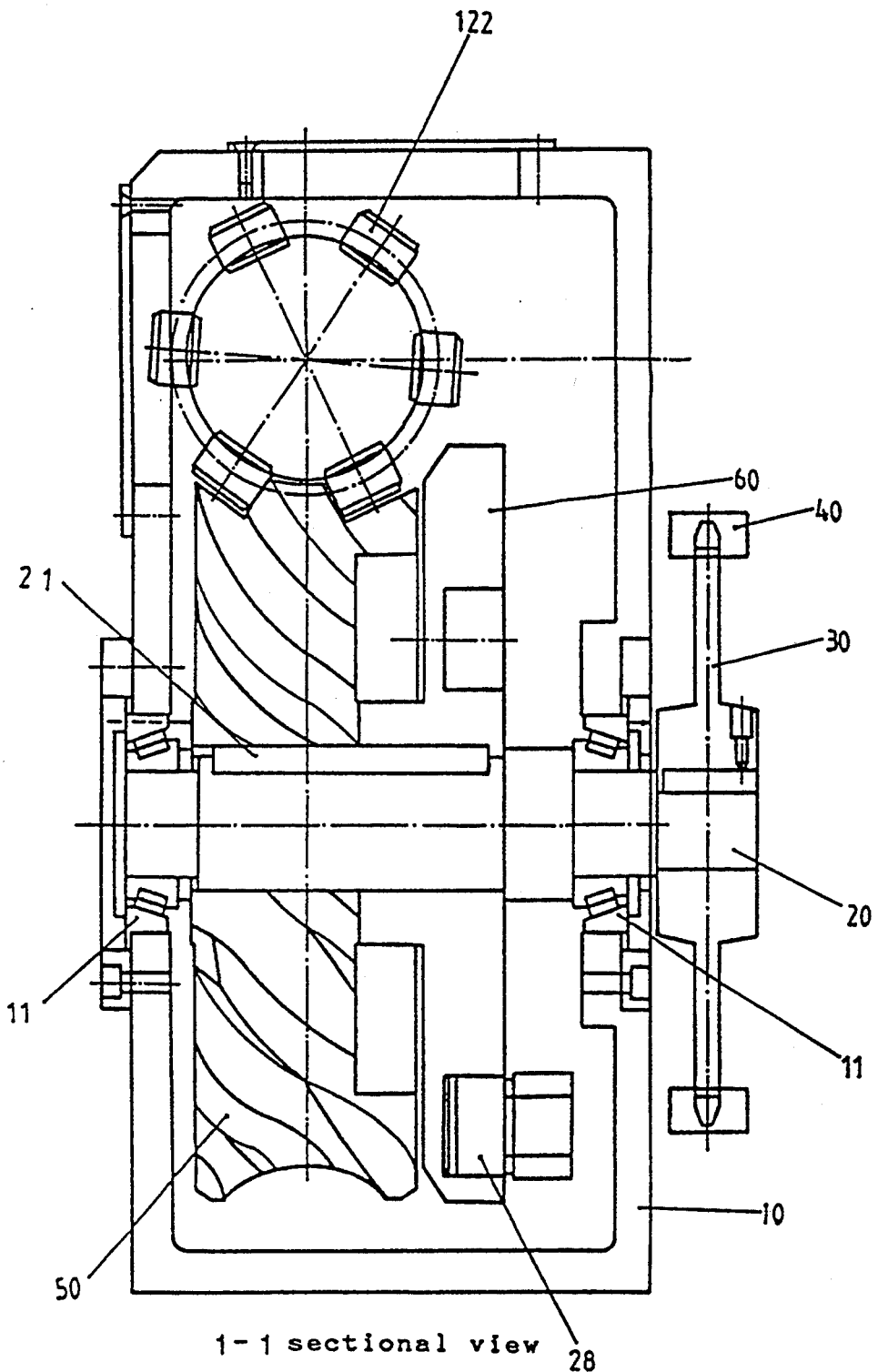
FIG. 2 shows a sectional view of a portion taken along the line 2—2 as shown in FIG. 1.
Figure 3:
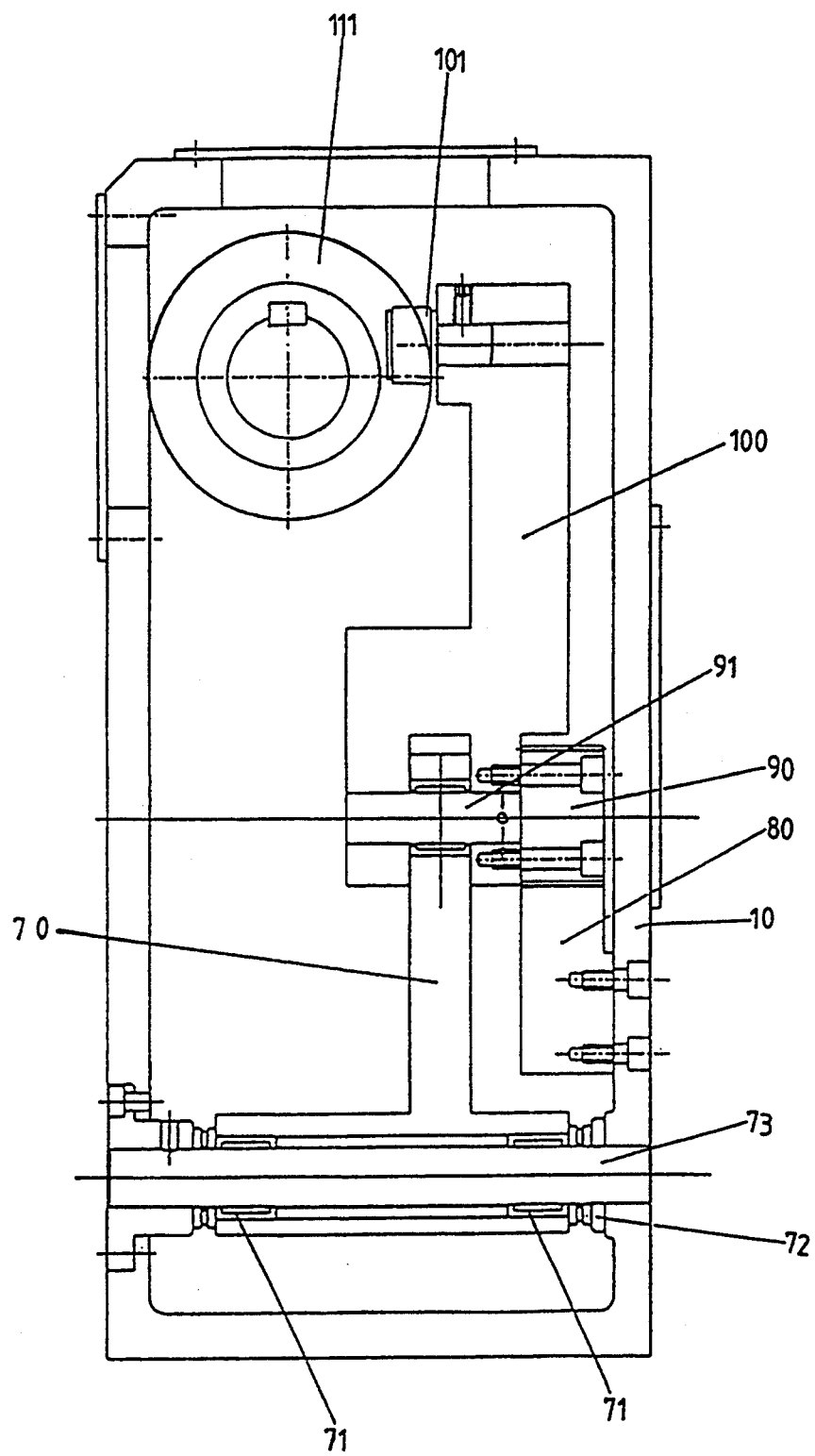
FIG. 3 shows a sectional view of a portion taken along the line 3—3 as shown in FIG. 1.
Figure 4:
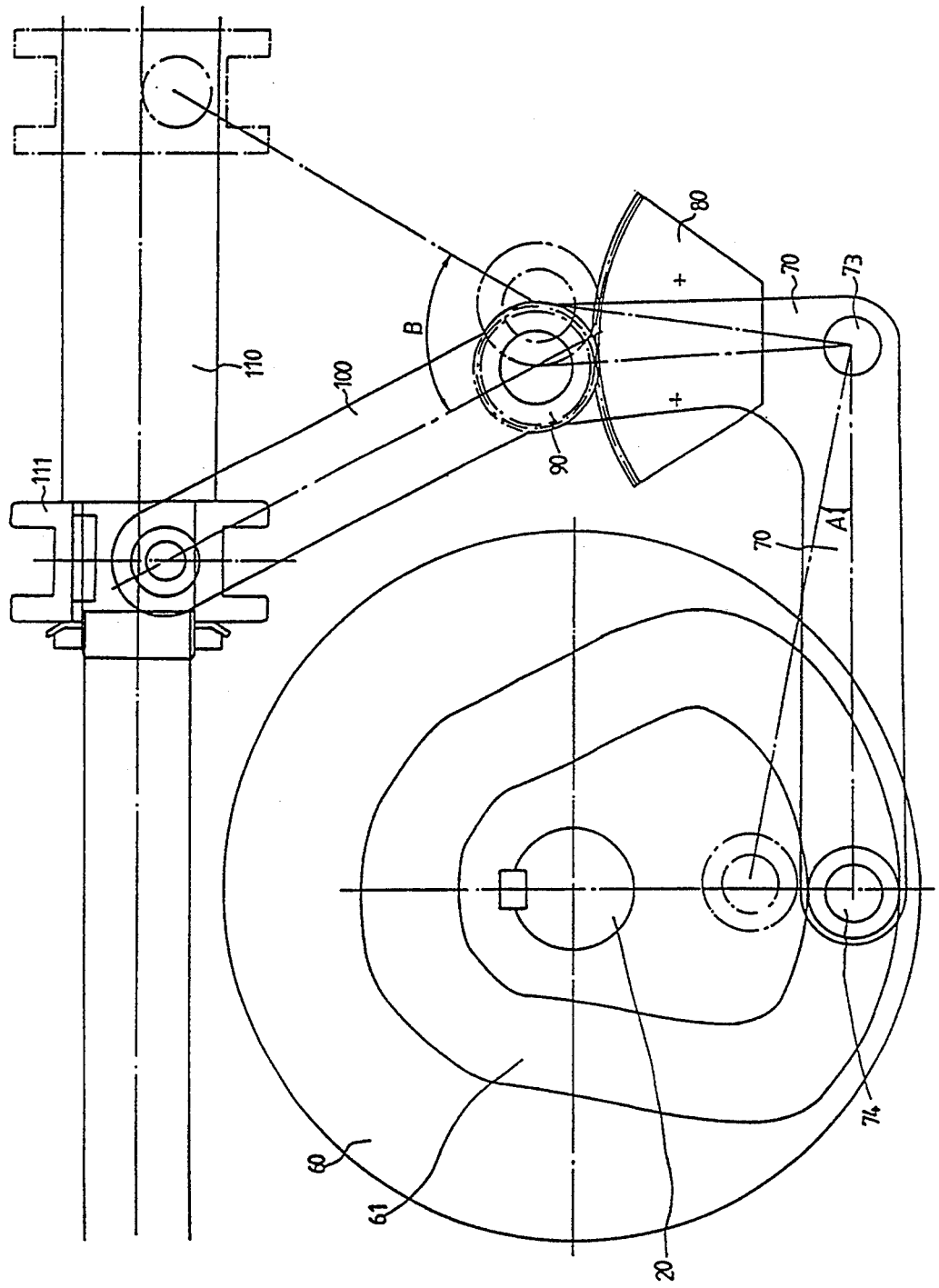
FIG. 4 is a schematic view illustrating a plunge motion of the present invention.
Figure 6A:
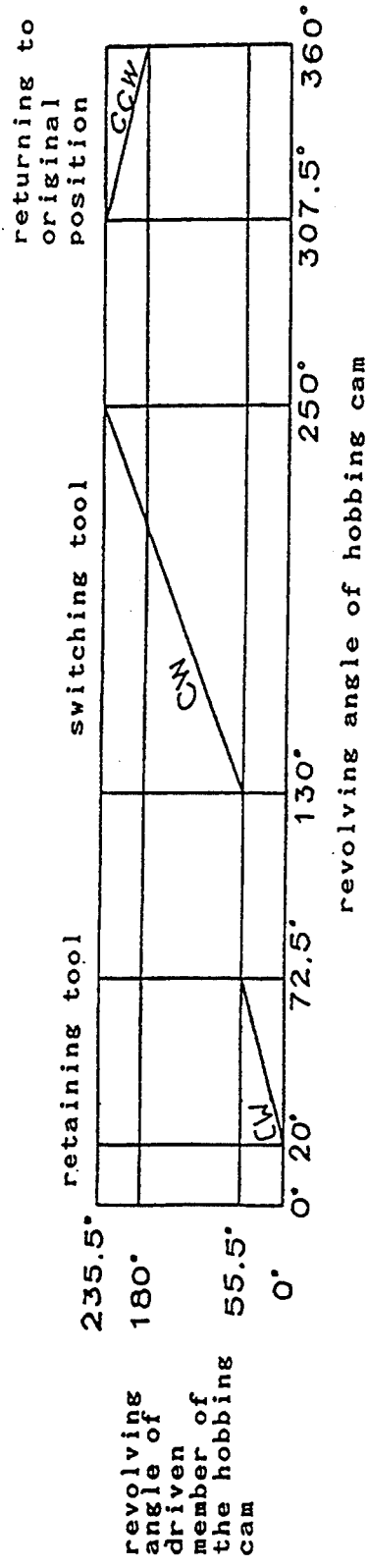
FIGS. 6A and 6B show two diagrams, respectively illustrating the time sequences of a roll gear cam and a slotted cam of the present invention.
Figure 6B:
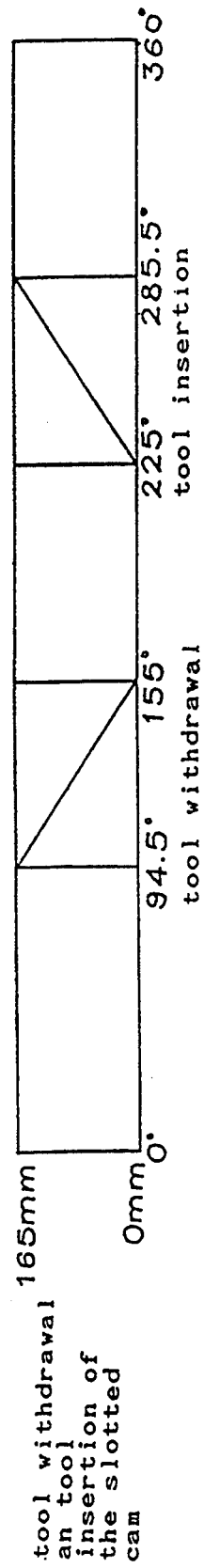

As shown in FIGS. 1 and 2, a case 10 comprises a cam shaft 20, which is mounted rotatably on bearings 11 and is driven by a motor (not shown in the drawings) through a sprocket 30 and a chain 40. The cam shaft 20 is linked by a key 21 with a slotted cam 60 and a roll gear cam 50 spiral ribs. The slotted cam 60 is provided thereon with a cam-profile groove 61. Now referring to FIGS. 1, 3, and 4, an L-shaped rod 70 is shown to be mounted on a shaft 73 by means of bearings 71 and a thrust bearing 72 such that the L-shaped rod 70 is capable of doing a rocking motion. The L-shaped rod 70 is provided at the posterior end thereof with a driven roller 74 fastened thereto and dimensioned to fit into the groove 61 of the slotted cam 60. As a result, the L-shaped rod 70 is capable of doing a rocking motion at a precise angle at the time when the slotted cam 60 is driven by the shaft. 20 to cause the roller 74 to travel along the course of the groove 61. A sector gear 80 and a planetary gear 90 are mounted on the case 10 such that the sector gear 80 meshes with the planetary gear 90. As shown in FIG. 5, the L-shaped rod 70 is fastened at one end thereof with a shaft 91 of the planetary gear 90 by means of a bearing. An output 100 is fixed at one end thereof with the shaft 91 of the planetary gear 90 As a result, the rocking motion of the L-shaped rod 70 actuates the planetary gear 90 to turn along the sector gear 80, thereby causing the output pitman 100 to be driven by the planetary gear 90 to swing at a large angle. An output roller 101 fastened to the end of the output pitman 100 is therefore able to push the shift 111 of a tool change shaft 110 so as to cause the tool change shaft 110 to engage in a linear motion. As illustrated 10 in FIG. 4, the L-shaped rod 70 is caused to swing for an angle designated as A at the time when the slotted cam 60 has completed a rotation of 180 degrees. The retational angle A of the L-shaped rod 70 is then enlarged into an rotational angle B of the output pitman 100, by way of the sector gear 80 and the planetary gear 90, thereby maximizing the effect of the linear motion of the tool change shaft 110. As shown in FIGS. 1 and 2, a turret 120 is rotatably supported on the case 10 by means of a bearing 121 and provided at the front end thereof with six rollers 122 which are arranged equidistantly and radially. The rollers 122 of the turret 120 can cooperate with the spiral ribs of the roller gear cam 50. The turret 120 is provided with a spline 123 by means of which the turret tower 120 is joined with the tool change shaft 110. As a result, the turret 120 can be caused to rotate when the roller gear cam rotates, thereby causing the tool change shaft 110 to engage in a revolving motion. As shown in FIG. 1, the tool change shaft 110 is provided at the posterior end thereof with a tool change arm 130 fastened thereto. The tool change arm 130 is in turn provided at both ends thereof with tool mounts 131 and 132. As the cam shaft 20 completes one revolving cycle, the cycle of one tool change action is then finished. It should be noted here that the ability of the tool change shaft 110 to do a precision revolving motion or a precision linear motion is dependent on the time chart design between the slotted cam 60 and the roll gear cam 50. As illustrated in FIGS. 6A and 6B, the cam follower 74 of the slotted cam 60 remains stationary at the time when the roller gear cam 50 is caused to turn so as to retain the tool, to retrieve the tool, and to switch the tool. The roller 122 of the roller gear cam 50 also remains stationary when the slotted cam 60 turns to bring about the first half period of a tool pulling action and the second half period of a tool inserting action. The roller gear cam 50 starts to turn to bring about a tool change action when the rotation of the slotted cam 60 is at the second half period of the tool withdrawing action. The slotted cam 50 also starts to turn to bring about a tool inserting motion at the time when the tool switching action is about to end. The tool switching action of the present invention is brought about in six sequences, as illustrated in FIGS. 7A through 7F. The first sequence shows that the tool change arm 130 is at a standby position. The second sequence includes an actuation of the turret 120 by the roller gear cam 50 to bring about the reverse rotation of the tool change arm 130 to retain the tool, The third sequence involves a process in which the output pitman 100 is driven by the slotted cam 60 to engage in a tool pulling action, The fourth sequence comprises an actuation of the turret 120 by the roller gear cam 50 to engage in a turret rotation so as to bring about a tool change action, The fifth sequence includes a process in which the output pitman 100 is driven by the slotted cam 60 to do a tool inserting motion, The sixth sequence comprises a process in which the transfer tower 120 is driven by the roller gear cam 50 to engage in a reverse rotation so as to cause the tool change arm 130 to return to the standby position of the first sequence. The tool change operation of the present invention is brought about by the six sequences described above.

According to the present invention, the tool change shaft is driven to do a revolving motion by of the roller gear cam and the turret. The linear motion of the tool change shaft of the present invention is brought about by the slotted cam, the link rod, the sector gear and the planetary gear.

The advantages inherent in the present invention are readily apparent and are further elucidated hereinafter.

The stroke length of the tool change shaft of the present invention is increased without an increase in the volume of the cam to overcome the the excess of the pressure angle of the cam, thanks to the fact that the present invention makes use of the slotted cam and the gear mechanisms in conjunction with the link rod.

The operational precision and speed of the mechanism of the present invention are greatly enhanced by the precise time chart design of the roller gear cam and the slotted cam.

The mechanical wear of the present invention is minimized by making use of the cam motion curve of the slotted cam in conjunction with the link mechanism.

The ratio of the gear sets of the present invention can be changed as desired. As a result, the angular amplification of the present invention is twice is effective as when the gear sets are in the gear ratio one.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An automatic tool change mechanism comprising:
   a case;
   a cam shaft mounted on said case by means of a bearing with one end of said cam shaft being connected with a power source by means of a sprocket and a chain;
   a slotted cam with a cam-profile groove provided thereon and fastened by means of a key with said cam shaft;
   an L-shaped rod provided at one end thereof with a driven roller fastened thereto and dimensioned to fit into and move along a course of cam-profile groove of said slotted cam, said L-shaped rod being supported on a shaft by means of a bearing;
   a sector gear mounted securely on said case;
   a planetary gear engaging said sector gear and having a shaft fastened with said L-shaped rod; an output pitman having one end that is fastened with said planetary gear;
   a tool change shaft provided at an appropriate position thereof with a shift ring fastened thereto by means of a key;
   a roller gear cam fastened with said cam shaft and provided thereon with a plurality of spiral ribs;
   a turret normal to said cam shaft and having a plurality of driven rollers which are arranged equidistantly and in a radial pattern and which can cooperate with said spiral ribs of said roller gear cam, said turret being fastened with said tool change shaft by means of a spline; and a tool switching arm fastened centrally with said tool change shaft such that said tool change arm is normal to said tool change shaft, said tool change area being provided at both ends thereof with a tool;

wherein said tool switching shaft is caused to make a rotation by a reverse rotation of said cam shaft which in turn drives said roller gear cam to rotate so as to cause said spiral ribs of said roller gear cam to cooperate with said driven rollers of said turret;

wherein said L-shaped rod is caused to swing at a precise angle by means of said driven roller which is driven to move along said course of said cam-profile groove of said slotted cam actuated to turn by said cam shaft; and wherein said planetary gear is actuated to turn by said L-shaped rod so as to cause said output pitman to swing at a great angle, thereby causing said tool change shaft to engage in a linear motion of a long stroke.

2. The automatic tool change mechanism according to claim 1 wherein said output pitman can be caused to swing at a relatively large angle by adjusting a gear ratio between said sector gear and said planetary gear.

3. The automatic tool change mechanism according to claim 1 wherein said sector gear and said planetary gear are so disposed such that said sector gear and said planetary gear can be interchanged with each other in their respective places.

4. The automatic tool change mechanism according to claim 1 wherein said power source is an induction motor.

* * * * *